United States Patent
Kurts et al.

(10) Patent No.: US 7,222,254 B2
(45) Date of Patent: May 22, 2007

(54) SYSTEM AND METHOD FOR OVER-CLOCKING DETECTION OF A PROCESSOR UTILIZING A FEEDBACK CLOCK RATE SETTING

(75) Inventors: Tsvika Kurts, Haifa (IL); John W. Horigan, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 483 days.

(21) Appl. No.: 10/663,098

(22) Filed: Sep. 15, 2003

(65) Prior Publication Data

US 2005/0060595 A1 Mar. 17, 2005

(51) Int. Cl.
*G06F 5/06* (2006.01)
*G06F 1/00* (2006.01)
*G06F 1/04* (2006.01)

(52) U.S. Cl. ............... 713/600; 713/501; 327/292

(58) Field of Classification Search ............... 713/600, 713/500, 501, 100; 327/292; 324/520; 714/731, 714/744

See application file for complete search history.

(56) References Cited

U.S. PATENT DOCUMENTS

| | | | | |
|---|---|---|---|---|
| 5,734,274 A | * | 3/1998 | Gavish | 327/48 |
| 5,841,287 A | * | 11/1998 | Duley | 324/537 |
| 6,073,249 A | * | 6/2000 | Watabe et al. | 714/4 |
| 6,175,929 B1 | * | 1/2001 | Hsu et al. | 713/500 |
| 6,226,741 B1 | * | 5/2001 | Shen et al. | 713/100 |
| 6,385,735 B1 | * | 5/2002 | Wilson et al. | 713/501 |
| 6,535,988 B1 | | 3/2003 | Poisner | |
| 6,691,242 B1 | * | 2/2004 | Pollock et al. | 713/503 |

OTHER PUBLICATIONS

Disclosed Anonymously, Device for overclock detection and marking, Apr. 2000, Research Disclosure, Database No. 432076.*

* cited by examiner

*Primary Examiner*—Chun Cao
*Assistant Examiner*—Suresh K Suryawanshi
(74) *Attorney, Agent, or Firm*—Robert A. Diehl

(57) ABSTRACT

A processor provides a configured clock rate setting for use by a peripheral set. The processor receives back from the peripheral set a feedback clock rate setting. The configured clock rate setting and the feedback clock rate setting are compared to detect over-clocking of the processor.

39 Claims, 7 Drawing Sheets

SYSTEM AND METHOD FOR OVER-CLOCKING DETECTION OF A PROCESSOR UTILIZING A FEEDBACK CLOCK RATE SETTING

FIELD OF THE INVENTION

The present invention relates to the field of processors. More specifically, the present invention relates to detecting processor over-clocking.

BACKGROUND

Terms such as clock rate, operating frequency, processor speed, and core rate are often used to describe the performance of a processor. These terms are widely recognized as the megahertz (MHz) or gigahertz (GHz) rating of a computer. In general, a higher clock rate means that a processor can perform more instructions per second.

A variety of factors can contribute to selecting a clock rate for a given processor. For instance, slight imperfections and variations during the manufacturing process can have an impact on how quickly and reliably a processor can be operated. In which case, different processors from the same manufacturing process may support different maximum clock rates. Put another way, several processors may appear interchangeable, but they may each be configured to operate at a different clock rate.

Wafer yield rates tend to be lower for faster processors. That is, the percentage of processors that can support a given clock rate setting tends to decrease as the clock rate setting increases. In which case, the manufacturing costs, and sale prices, tend to be higher for faster processors. These higher prices create an incentive for over-clocking.

Over-clocking refers to operating a processor at a higher clock rate than the processor is configured for. For instance, unscrupulous individuals or companies may purchase less expensive, slower processors and repackage them to run at higher clock rates. Often times, these over-clocked processors are re-sold as more expensive, faster processors.

Over-clocking can be problematic for both the processor manufacturer and the end user. Not only does the manufacturer loose revenue by selling the less expensive processor, but the over-clocked processor may not reliably support the higher clock rate, which can erode the manufacturer's reputation for quality. And, not only does the end user overpay for what he or she actually receives, but the end user may be frustrated by less-than-expected reliability.

BRIEF DESCRIPTION OF DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

Embodiments of the present invention can detect at least one type of processor over-clocking. A processor often includes a memory element that is configured to store the clock rate setting for the processor. This memory element can be used by components or circuits that are peripheral to the processor to determine the processor's configured clock rate setting. The set of peripherals, or "peripheral set," as the term is used herein, broadly refers to one or more components or circuits coupled with a processor, such as a clock generator, chip set, and the like. For example, a clock generator may need to know the processor's clock rate setting in order to generate a "source" clock signal for the processor. That is, a peripheral clock generator often provides the clock signal that ultimately drives the processor. In which case, to over-clock the processor, the configured clock rate setting can be bypassed before it reaches the peripheral set, and a higher setting can be provided instead. Put another way, the peripheral set may be fooled into thinking that the processor is configured to run faster than it really is.

In embodiments of the present invention, however, the clock rate setting used by the peripheral set is fed back to the processor. The processor can then detect whether or not it is over-clocked by comparing the configured clock rate setting to the clock rate setting that is fed back from the peripheral set.

Figure 1:
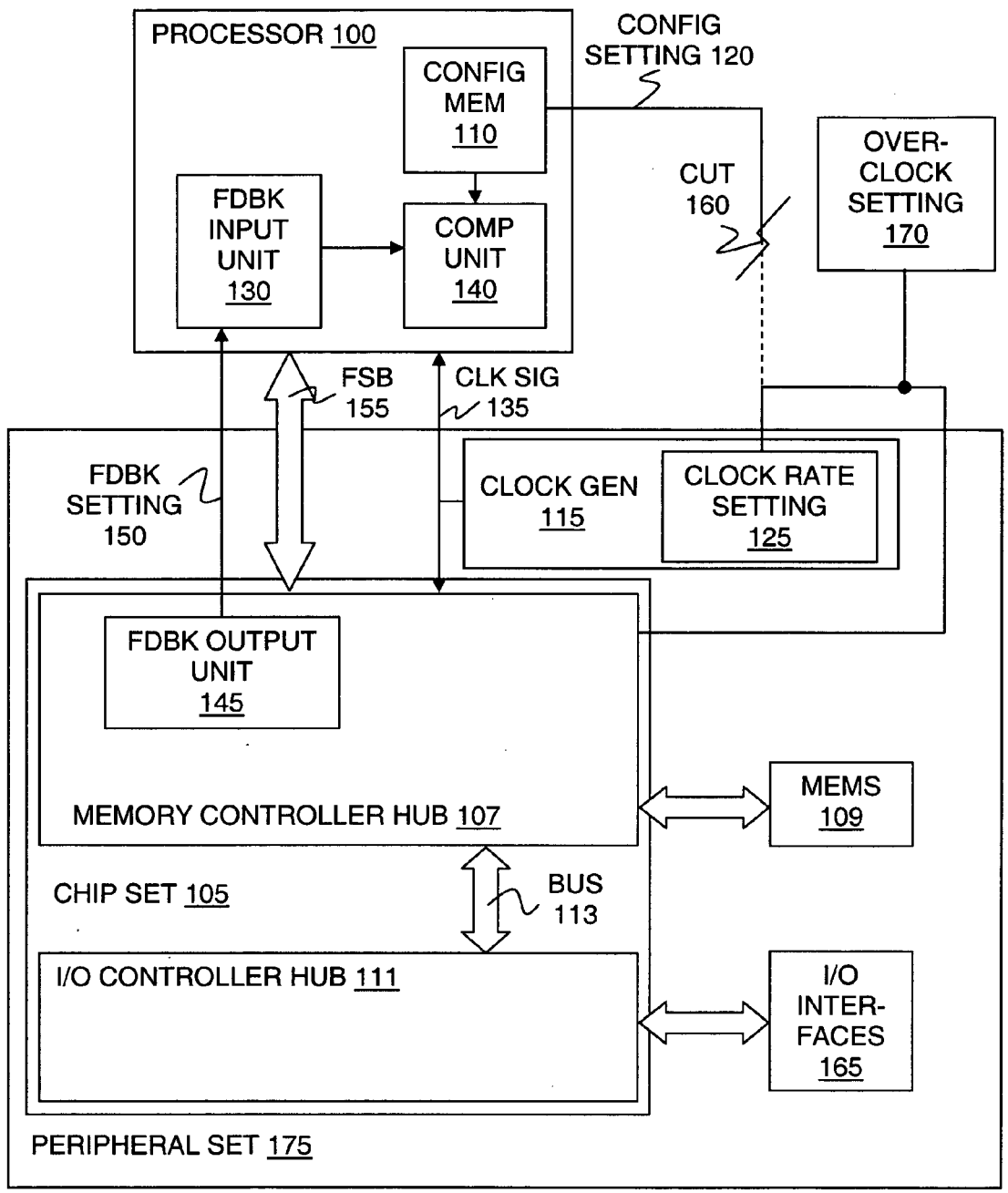
FIG. 1 illustrates one embodiment of a system in which over-clocking can be detected.

FIG. 1 illustrates one embodiment of a system that can detect over-clocking. In FIG. 1, a processor 100 is supported by a peripheral set 175. Processor 100 includes a memory element 110, a feedback input unit 130, and a comparison unit 140. Memory element 110 stores a configured clock rate setting 120 for processor 100. Feedback input unit 130 receives a feedback clock rate setting 150 from peripheral set 175. Comparison unit 140 compares the configured clock rate setting 120 to the feedback clock rate setting 150 to detect over-clocking.

Peripheral set 175 includes a clock generator 115, a chip set 105, various memories 109, and various input/output (I/O) interfaces 165. The architecture of chip set 105 is organized around a memory controller hub (MCH) 107 and an I/O controller hub (ICH) 111. Memory controller hub 107 controls interactions with memories 109. For example, memory controller hub 107 is likely to determine a host-clock-to-memory-clock (Hclock/Mclock) ratio to synchronize one or more memory clocks to the processor's clock. I/O controller hub 111 controls interactions with I/O interfaces 165. A bus 155, often called a front side bus (FSB), couples processor 100 to memory controller hub 107. Another bus, bus 113, couples memory controller hub 107 with I/O controller hub 111. Clock generator 115 generates a clock signal 135 based on clock rate setting 125, and supplies clock signal 135 to both processor 100 and memory controller hub 107. Memory controller hub 107 includes a feedback output unit 145 that generates feedback clock rate setting 150 and provides it to feedback input unit 130 in processor 100.

Feedback output unit 145 can generate the feedback clock rate setting 150 in any number of ways. For example, in order to synchronize the memories and the processor, memory controller hub 107 may store the same clock rate setting 125 that is used by clock generator 115. In which case, feedback output unit 145 may comprise the memory element or register that stores the clock rate setting. As another example, feedback output unit 145 could be a circuit that measures the actual frequency of clock signal 135.

Under normal circumstances, when processor 100 is not over-clocked, the configured clock rate setting 120 would be provided to both clock generator 115 and memory controller hub 107. In which case, the clock rate setting 125 used by clock generator 115 and memory controller hub 107 would be equivalent to the configured clock rate setting 120 provided by memory 110. Therefore, feedback clock rate setting 150 would also be equivalent, and comparison unit 140 would not detect over-clocking.

In the illustrated embodiment, however, the transmission path between memory 110 and clock generator 115 is cut at 160, and configured clock rate setting 120 is bypassed with a higher clock rate, over-clocked setting 170. This may fool peripheral set 175 into thinking that processor 100 is configured for a higher clock rate than it really is. Feedback output unit 145, however, can capture the higher clock rate and provide it to feedback input unit 130. Comparison unit 140 can then detect over-clocking by comparing the feedback setting 150 to the configured setting 120.

The configured clock rate setting 120 can be bypassed in any number of ways. For example, the data lines can be cut at the processor package level, between the processor core and the pin set connecting the processor core to the outside world. This usually involves inserting a micro-strip memory element, and is often referred to a "remarking" the processor. The data lines can also be bypassed at the platform level, between the processor package and the peripheral set.

The clock rate settings can take any of a variety of data formats. For example, a rate setting may be one or more bits wide, and the bits may be coded using Gray scale, binary, or any number of other notations. Depending on how the rate settings are coded, any number of circuits or digital comparators can be used to compare the settings.

Chip set 105 represents just one potential bus architecture. Alternate embodiments may use any of a wide variety of bus architectures. Furthermore, although feedback output unit 145 is shown as part of memory controller hub 107, it can be located in any number of other places. For example, unit 145 could be within clock generator 115, within processor 100, a separate component in peripheral set 175, etc.

In one embodiment, where feedback output unit 145 is part of memory controller hub 107, feedback clock rate setting 150 can be part of a bundle of signals, called power-on-configuration (POC) signals. POC signals are often generated by a memory controller hub and provided to a processor whenever the processor is reset.

Figure 2:
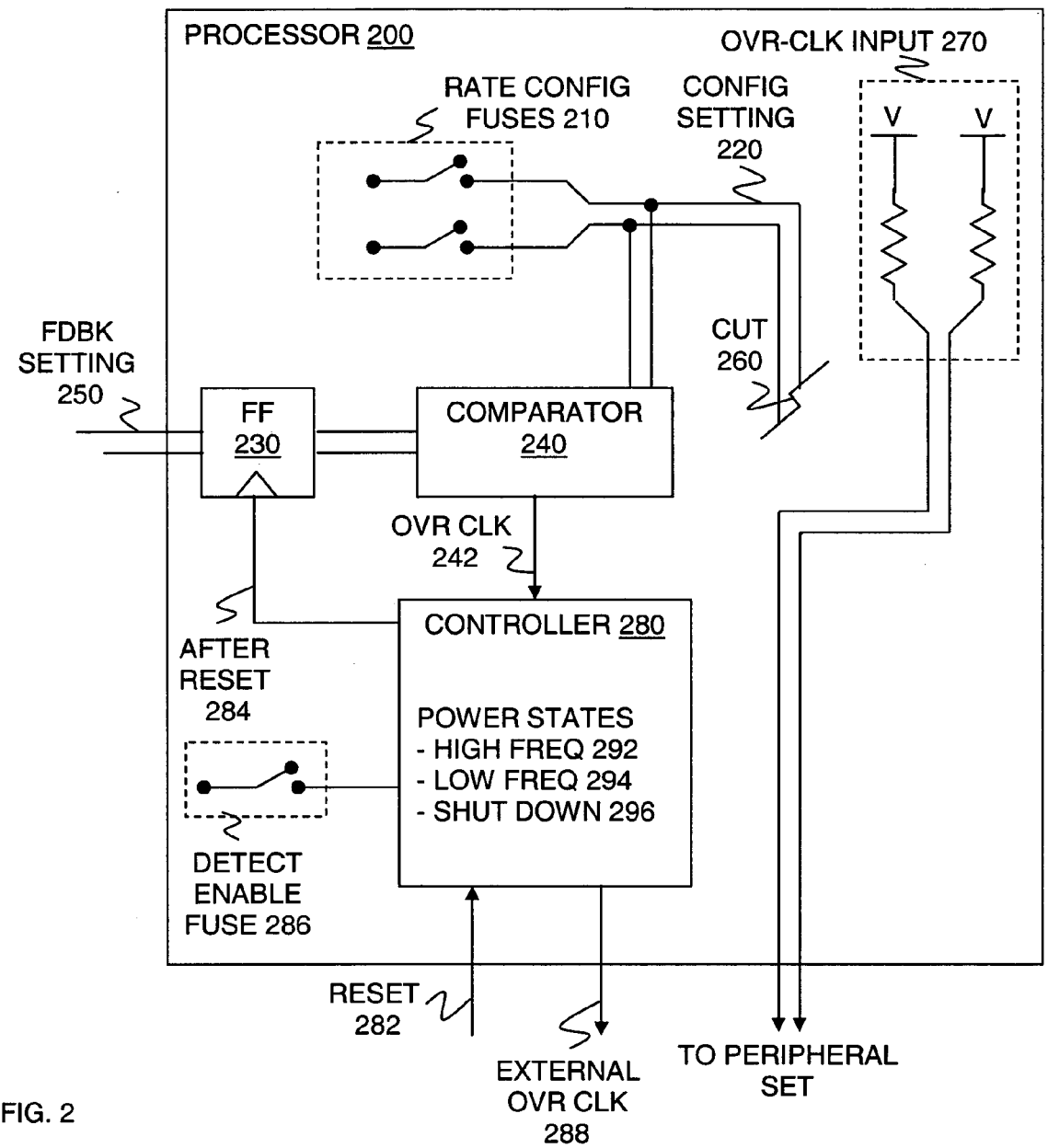
FIG. 2 illustrates one embodiment of components within a processor that can detect over-clocking.

FIG. 2 illustrates another embodiment of a processor 200 for detecting over-clocking. Processor 200, like processor 100 from FIG. 1, includes elements for storing the configured clock rate setting, receiving the feedback clock rate setting, and comparing the configured and fed back settings. For instance, in the illustrated embodiment, two fuses 210 are configured with the clock rate setting 220 for the processor. In other words, a two-bit code is used to represent the clock rate setting. Depending on the format of the code, the two bits could be used to represent up to four possible clock rates. Usually, fuses can only be configured once so that it would be difficult, if not impossible, to over-clock the processor by changing the configuration of the fuses.

In the illustrated example, both fuses are blown open. This could represent, for example, a digital code of 00, which could represent a slow clock rate configuration for this type of processor. To over-clock the processor, the output lines have been cut at 260 inside processor 100's package, and bypassed with over-clocked input 270. Over-clocked input 270 ties both lines to a voltage source, V. This could represent, for example, a digital code of 11, which could represent the fastest clock rate configuration for this type of processor.

The feedback input unit in the illustrated embodiment comprises a two-bit flip-flop register 230 to capture feedback clock rate setting 250. With both rate settings represented by two bit values, and with a larger clock setting represented by a larger digital value, a digital comparator 240 can detect over-clocking and assert over-clock signal 242 when feedback setting 250 has a larger digital value then configured setting 220.

In addition, processor 200 includes a controller 280. Controller 280 represents a variety of administrative functions performed within the processor to manage, for example, power control and, in this case, over-clocking detection. The administrative functions can be implemented in any number of ways, including microcode executed by the processor, circuit components within the processor, and/or a combination of both.

In the illustrated embodiment, controller 280 uses three inputs, and generates two outputs, as part of over-clocking detection. The inputs are a reset signal 282, the over-clock signal 242 from comparator 240, and an enable signal from over-clock detection fuse 286. Reset signal 282 is externally generated to reset the processor 200. Over clock signal 242 is asserted when comparator 240 detects over-clocking.

Detect enable fuse 286 is one-time configurable to enable over-clocking detection. The enable fuse 286 can be used, for example, to allow over-clocking in a lab or test environment. But, before the processor is sold or otherwise distributed, fuse 286 can be blown to enable over-clocking detection.

One of the outputs is called after reset signal 284. Signal 284 can be used to clock flip-flop 230 to capture the current feedback setting 250 at, for example, an appropriate time after a reset of the processor. That is, each time the processor is reset, the processor may go through a number of initializing routines, including restarting the clock. Various signals, including the feedback setting 250, may not be stable during a certain hold time following reset. Therefore, controller 280 can wait until after the hold time before clocking flip-flop 230.

The other output is external over-clocked signal 288. If over-clock signal 242 is asserted, and detect enable fuse 286 is enabled, controller 280 can assert signal 288 to flag the over-clocked condition.

More importantly perhaps, controller 280 can change the power state of processor 200. Any number of power states and power management techniques can be used. In the illustrated embodiment, processor 200 has three power states, high frequency mode (HFM) 292, low frequency mode (LFM) 294, and shut down mode 296. In which case, if over-clock signal 242 is asserted, and detect enable fuse 286 is enabled, controller 280 can slow down the performance of the processor or completely shut it down, depending on how aggressive the controller 280 is designed to be.

Figure 3:
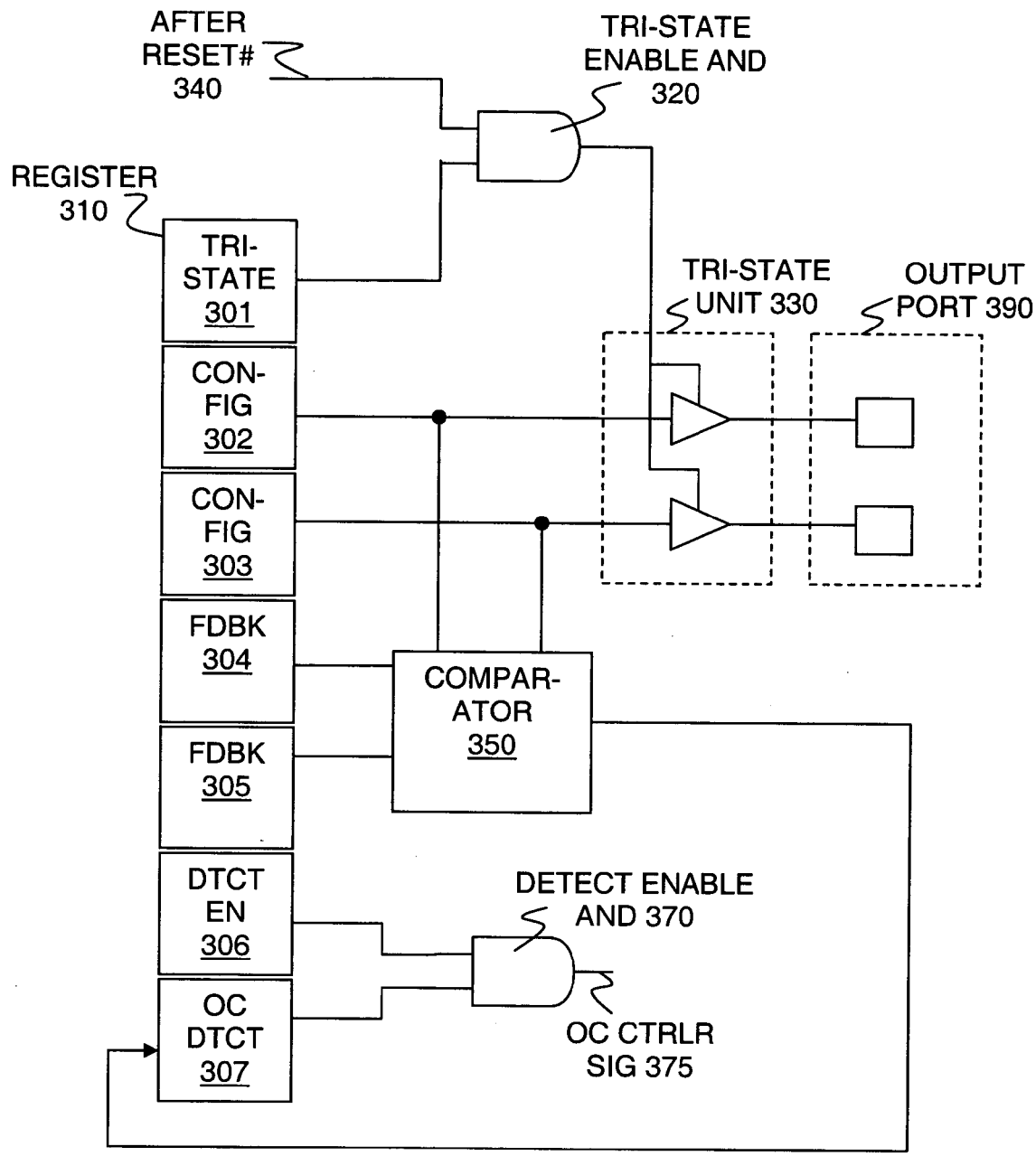
FIG. 3 illustrates another embodiment of components within a processor that can detect over-clocking.

FIG. 3 illustrates yet another embodiment of a processor 300 for detecting over-clocking. A register 310 stores a number of bits that are used for over-clocking detection, including configure bits 302 and 303, which represent the configured clock rate setting, and feedback bits 304 and 305, which represent the clock rate setting fed back from the chip set. As in the previously described embodiments, the configure bits and the feedback bits can be compared by comparator 350 to detect over-clocking.

The output of comparator 350 can be stored in detect bit 307 in register 310. Detect enable bit 306 can be ANDed with detect bit 307 by detect enable AND 370 to generate an over-clock controller signal 375 for a controller (not shown) such controller 280 from FIG. 2 described above.

The illustrated embodiment also includes a tri-state unit 330 that controls the output of configure bits 302 and 303 to output ports 390. That is, the signals on output ports 390 can be placed in tri-states when not in use in order to save power. Tri-state bit 301 in register 310 can be configured to enable the feature. An after-reset signal# 340 can be ANDed with bit 301 by tri-state enable AND 320 to control when ports 390 are tri-stated. For example, ports 390 may only need to be active for a period of time following a reset of the processor. During that period of time, the peripheral set can latch the configured clock rate setting from ports 390 and initiate the clock accordingly. After that period of time has passed, after reset signal 340 can transition so that ports 390 are tri-stated. Any number of techniques can be used to generate signal 340, including microcode execution.

Figure 4:
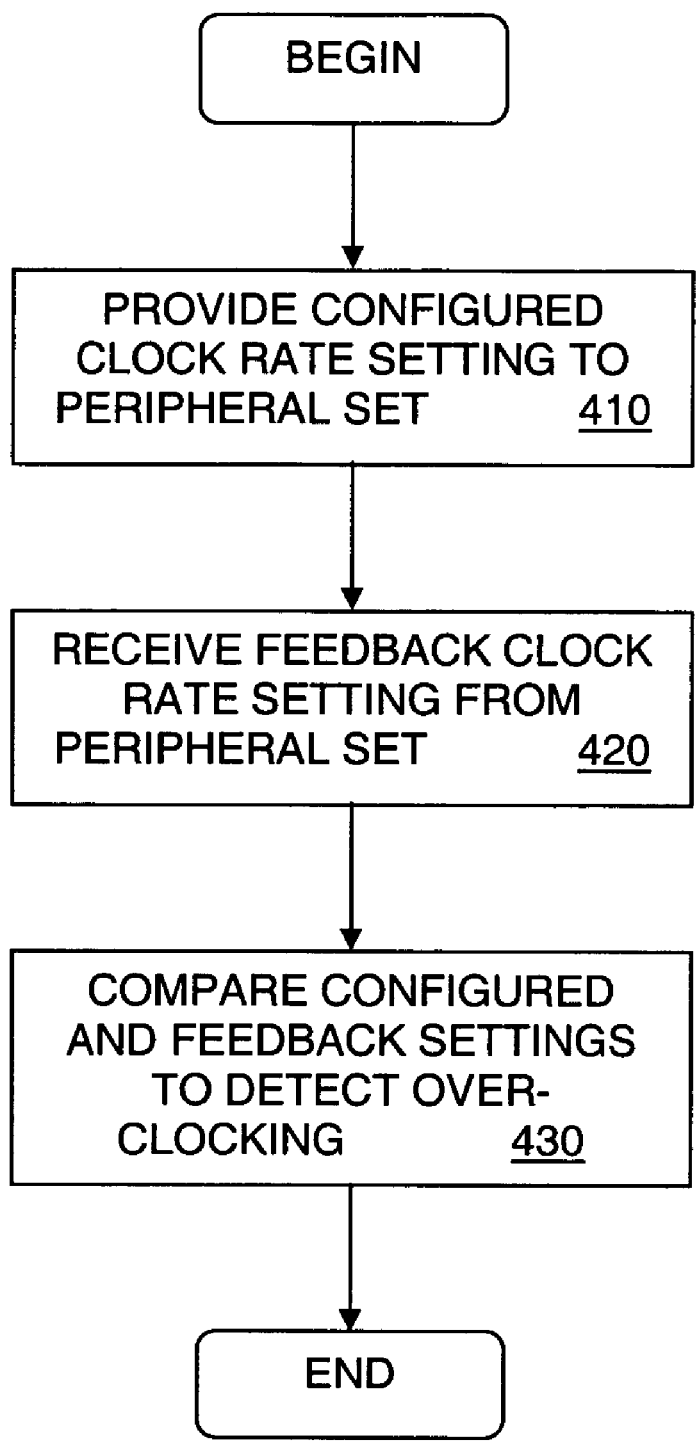
FIG. 4 demonstrates one embodiment of a process for detecting over-clocking.

FIG. 4 demonstrates one embodiment of detecting over-clocking from the perspective of a processor at a high level. At 410, the processor provides the configured clock rate setting. At 420, the processor receives the feedback clock rate setting. And, at 430, the processor compares the two clock rates. If the feedback clock rate setting is higher than the configured clock rate setting, over-clocking can be detected.

Figure 5:
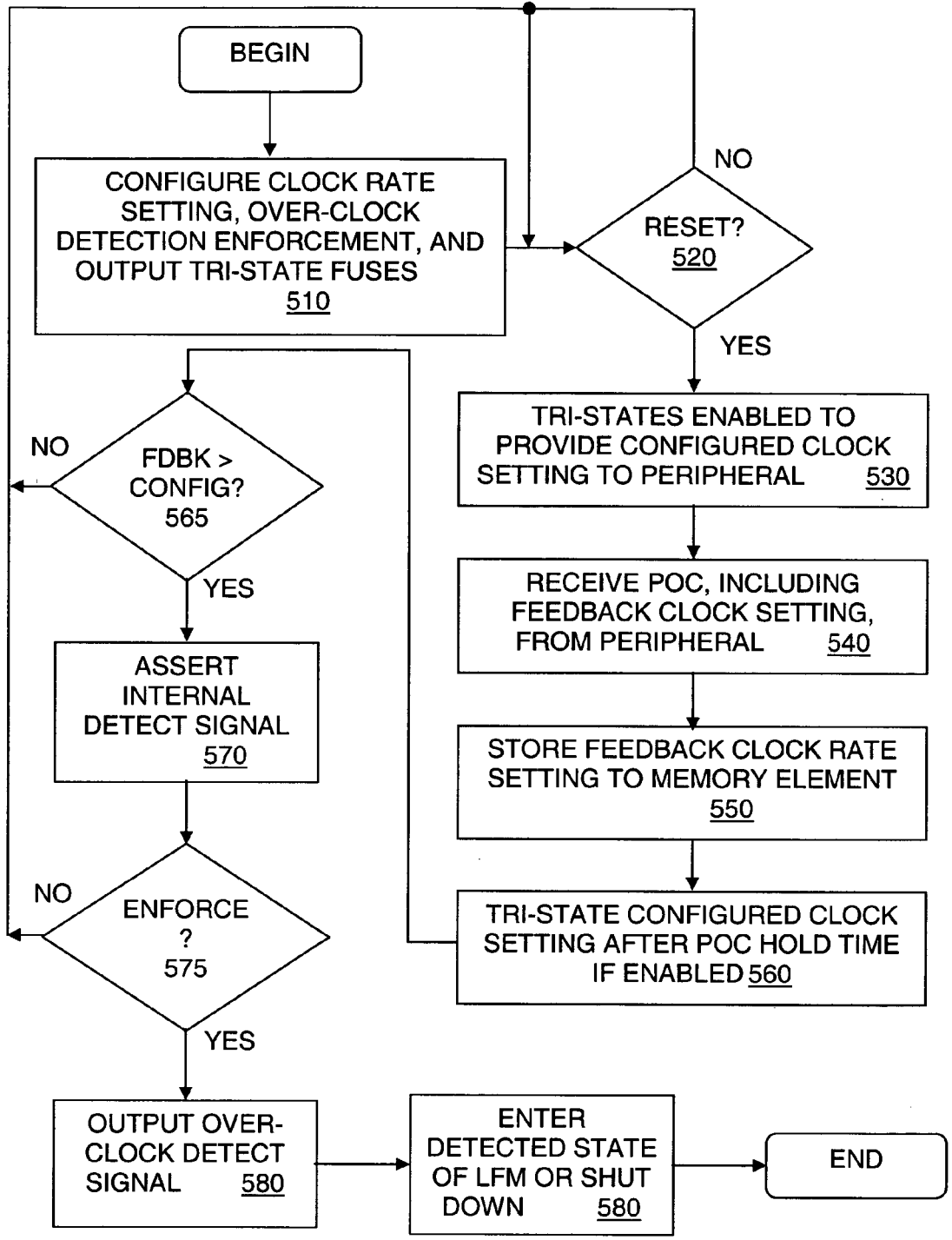
FIG. 5 demonstrates one embodiment of a process for detecting over-clocking from the perspective of a processor.

FIG. 5 illustrates one embodiment of over-clocking detection from the perspective of a processor in more detail. At 510, fuses to control the processor's clock rate setting, over-clocking detection, and the tri-state feature are configured. At 520, over-clocking detection waits for the processor to be reset. Once a reset is initiated, tri-state devices are enabled to provide the configured clock rate signal to the peripheral set at 530. At 540, the processor receives a power-on-configuration (POC) signal from the peripheral set. The POC signal includes the feedback clock rate setting.

The feedback setting is stored by the processor to a memory element, such as a flip-flop, at 550. At 560, after a certain hold time has passed, during which the peripheral set is presumed to have successfully captured the configured clock setting, the processor can tri-state the output ports for the configured clock rate signal, if the tri-state fuse is enabled, to reduce power consumption.

At 565, the processor compares the feedback setting and the configured setting. If the feedback setting is less than or equal to the configured setting, no over-clocking is detected and the detection process returns to 520 to wait for another reset. If, however, the feedback setting is greater than the configured setting, the processor proceeds to assert an internal detection signal at 570. At 575, if the appropriate fuse is not configured to enable over-clocking detection, the processor permits the over-clocking and returns to 520 to wait for another reset. This could, for example, allow over-clocking in a lab environment.

If over-clocking detection is enabled at 575, the processor outputs an external over-clocking signal at 580. In an alternate embodiment, 580 and 575 could be switched so that the over-clocking signal is generated even if over-clocking is permitted.

At 585, the processor enters a detected state, such as a low frequency mode or a shut down mode. In the illustrated embodiment, the processor is permanently set in the detected state once the over-clocking detection process is allowed to reach 585. In alternate embodiments, the processor may be allowed to return to a normal mode of operation when the processor is no longer over-clocked, or to repeat the process each time the processor is reset.

Figure 6:
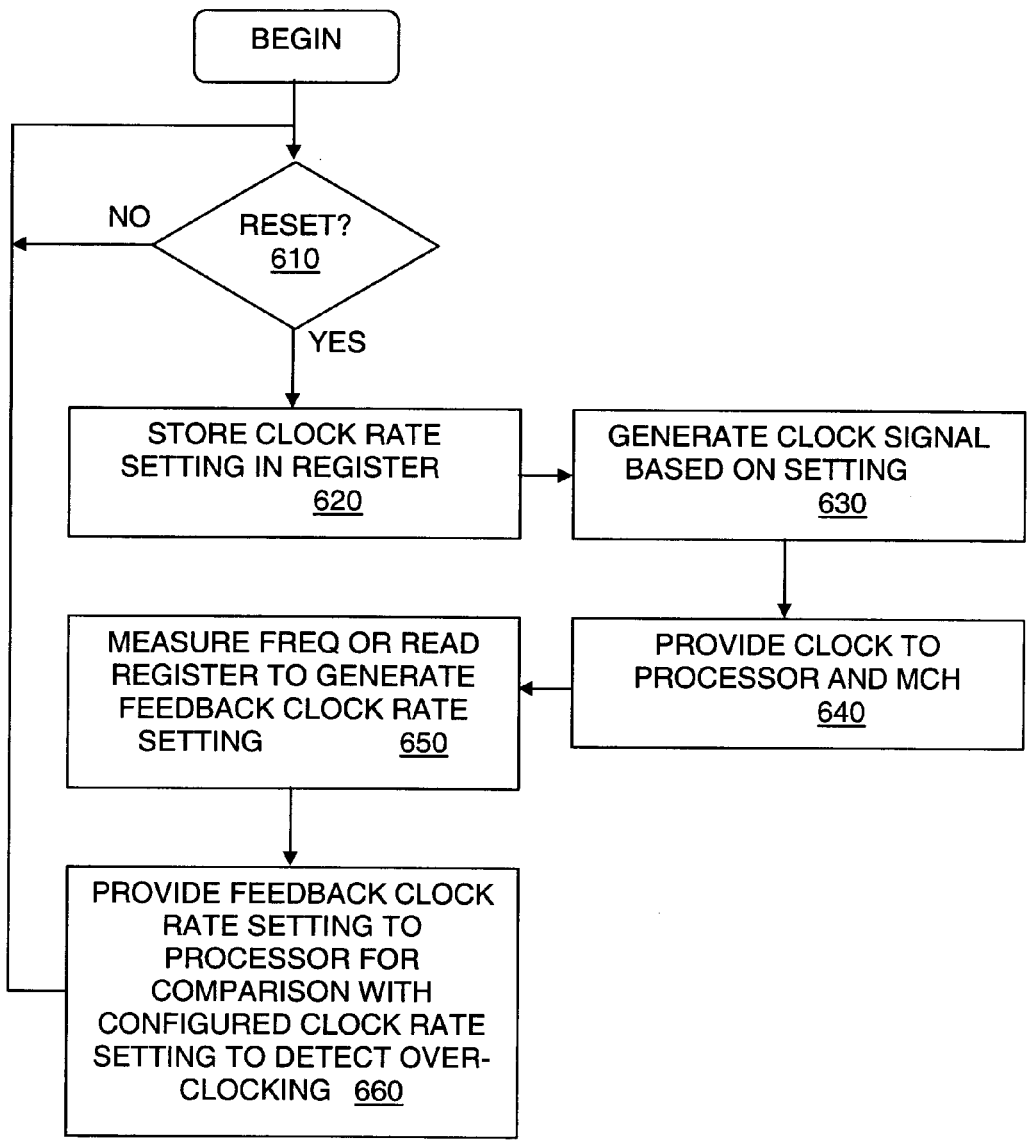
FIG. 6 demonstrates one embodiment of a process for detecting over-clocking from the perspective of a chip set.

FIG. 6 demonstrates one embodiment of over-clocking detection from the perspective of a peripheral set. At 610, the over-clocking detection process waits for the processor to be reset. When a reset is initiated, the peripheral set stores a clock rate setting in a register at 620. The stored setting may or may not be the configured clock rate setting from the processor, depending on whether or not the configured clock rate setting has been bypassed.

At 630, the peripheral set begins generating a clock signal based on the stored clock rate setting, and provides the clock signal to the processor at 640. At 650, the peripheral set generates the feedback clock rate setting by measuring the frequency of the clock signal or reading the stored clock rate setting. At 660, the peripheral set provides the feedback clock rate setting to the processor for comparison with the configured clock rate setting to detect over-clocking.

FIGS. 1–6 illustrate a number of implementation-specific details. Other embodiments may not include all of the illustrated elements, may include additional elements, may arrange elements in a different order, may combine one or more elements, and the like. The illustrated embodiments also show a number of functions that are performed by hardware components and other functions that are performed by executing microcode. In alternate embodiments, many of the functions described above can be implemented in hardware, microcode execution, or a combination of both.

Figure 7:
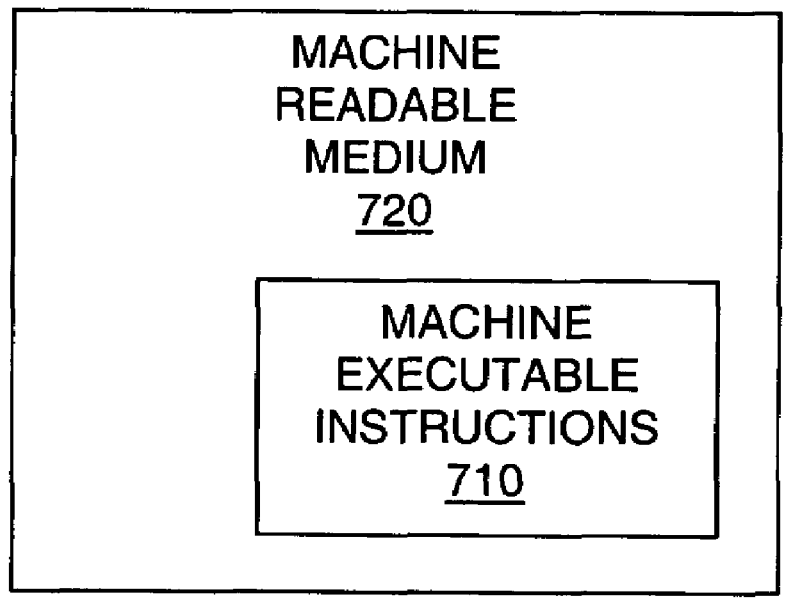
FIG. 7 illustrates one embodiment of a machine readable medium that can store executable instructions for detecting over-clocking.

As shown in FIG. 7, the microcode for various embodiments of the present invention can be machine executable instructions 710 stored using any machine readable storage medium 720, such as a hard drive, a diskette, compact disk, magnetic tape, digital video or versatile disk (DVD), laser disk, read only memory (ROM), random access memory (RAM), Flash memory, digital registers, etc.

Thus, over-clocking detection is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. An apparatus comprising:
   a memory element in a processor to supply a configured clock rate setting for use by a peripheral set;
   an input element in the processor to receive a feedback clock rate setting from the peripheral set, said feedback clock rate setting being bundled with a plurality of power-on-configuration (POC) signals received in response to a reset of the processor; and
   a comparison unit in the processor to compare the configured clock rate setting and the feedback clock rate setting to detect over-clocking of the processor.

2. The apparatus of claim 1 wherein the memory element comprises at least one fuse, said at least one fuse being one-time configurable with the configured clock rate setting.

3. The apparatus of claim 1 wherein the input element comprises at least one digital register, said at least one digital register being dynamically re-written for each reset of the processor.

4. The apparatus of claim 1 further comprising:
   a control unit in the processor to place the processor in a detected state if the comparison unit detects over-clocking.

5. The apparatus of claim 4 further comprising:
   a second memory element in the processor to store a detection enable setting, said control unit to place the processor in the detected state if both the over-clocking is detected and the detection enable setting is enabled.

6. The apparatus of claim 5 wherein the second memory element comprises a fuse, said fuse being one-time configurable with the detection enable setting.

7. The apparatus of claim 4 wherein the detected state comprises one of a low frequency mode and a shut down mode.

8. The apparatus of claim 4 wherein the control unit is further to output an over-clocked detection signal from the processor if the comparison unit detects over-clocking.

9. The apparatus of claim 1 further comprising:
   an output port on the processor for the configured clock rate setting; and
   a tri-state unit in the processor, coupled between the memory element and the output port, said tri-state unit to place the output port in a tri-state subsequent to a reset of the processor.

10. The apparatus of claim 9 further comprising:
    a second memory element to store a tri-state enable setting; and
    an enable unit to enable the tri-state unit based on the tri-state enable setting and a second signal asserted a particular time subsequent to the reset of the processor.

11. The apparatus of claim 10 wherein the enable unit comprises a logical AND of the tri-state enable selling and the second signal.

12. The apparatus of claim 1 wherein the configured clock rate setting and the feedback clock rate setting each comprise digital codes of at least one bit each, and wherein the comparison unit comprises a digital comparator.

13. The apparatus of claim 1 further comprising:
    the peripheral set.

14. The apparatus of claim 13 wherein the peripheral set comprises at least one of a clock generator, a memory, an input/output interface, a memory controller hub, and an input/output controller hub.

15. An apparatus comprising:
    a clock generator to generate a clock signal based on a clock rate setting, and said clock rate generator to provide the clock signal for use by a processor, said processor to provide a configured clock rate setting for use by the clock generator; and
    a clock rate feedback unit to generate a feedback clock rate setting based on a clock rate of the clock signal, and said clock rate feedback unit to bundle the feedback clock rate setting with a plurality of power-on-configuration (POC) signals provided to the processor in response to a reset of the processor, said feedback clock rate setting for comparison to the configured clock rate setting to detect over-clocking.

16. The apparatus of claim 15 wherein the clock rate feedback unit comprises one of:
    a circuit within the clock generator; and
    a circuit within a memory controller hub, said memory controller hub to couple with both the clock generator and the processor.

17. The apparatus of claim 15 wherein the clock rate feedback unit comprises one of:
    a frequency measurement circuit to measure a frequency of the clock signal; and
    a register to store a code indicating a current clock rate setting of the clock generator.

18. The apparatus of claim 15 wherein the clock generator and the clock rate feedback unit comprise a peripheral set to couple with the processor.

19. The apparatus of claim 15 further comprising:
    a memory element to store the clock rate setting during each reset of the processor.

20. The apparatus of claim 15 further comprising:
    a memory controller hub comprising at least one of the clock generator and the clock rate feedback unit; and
    a front side bus to couple the memory controller hub with the processor.

21. A system comprising:
    a processor;
    a clock generator to generate a clock signal for the processor based on a clock rate setting; and
    a memory controller hub to supply a feedback clock rate setting based on a clock rate of the clock signal, said feedback clock rate setting being bundled with a plurality of power-on-configuration (POC) signals generated in response to a reset of the processor;
    said processor comprising
    a memory element to provide a configured clock rate setting for use by the clock generator,
    an input element to receive the feedback clock rate setting from the memory controller hub, and
    a comparison unit to compare the configured clock rate selling and the feedback clock rate setting to detect over-clocking of the processor.

22. The system of claim 21 wherein the processor further comprises:
    a control unit to place the processor in a detected state if the comparison unit detects over-clocking.

23. The system of claim 22 wherein the detected state comprises one of a low frequency mode and a shut down mode.

24. A method comprising:
providing a configured clock rate setting from a processor for use by a peripheral set;
receiving a feedback clock rate setting at the processor from the peripheral set, said feedback clock rate setting being bundled with a plurality of power-on-configuration (POC) signals generated in response to a reset of the processor; and
comparing the configured clock rate setting and the feedback clock rate setting to detect over-clocking of the processor.

25. The method of claim 24 wherein comparing comprises:
determining if the feedback clock rate setting is higher than the configured clock rate setting.

26. The method of claim 24 further comprising:
configuring a memory element in the processor with the configured clock rate setting prior to providing the configured clock rate setting.

27. The method of claim 26 wherein configuring the memory element comprises:
blowing at least one fuse.

28. The method of claim 24 wherein receiving the feedback clock rate setting comprises:
storing the feedback clock rate setting to a memory element in the processor for each reset of the processor.

29. The method of claim 24 further comprising:
placing the processor in a detected state if over-clocking is detected.

30. The method of claim 29 wherein placing the processor in the detected state comprises:
asserting an enforce signal if over-clocking detection is enabled;
asserting a detection signal if over-clocking is detected; and
initiating the detected state it both the enforce signal and the detection signal are asserted.

31. The method of claim 29 wherein the detected state comprises one of a low frequency mode and a shut down mode.

32. The method of claim 29 wherein placing the processor in the detected state comprises:
outputting an over-clocked detection signal from the processor.

33. The method of claim 24 wherein providing a configured clock rate setting comprises outputting a configured setting signal from the processor, the method further comprising:
tri-stating the configured setting signal at a particular time subsequent to the reset of the processor.

34. A method comprising:
generating a clock signal at a peripheral set based on a clock rate setting;
providing the clock signal from the peripheral set for use by a processor, said processor to provide a configured clock rate setting for generating the clock signal;
generating a feedback clock rate setting based on a clock rate of the clock signal for use by the processor for comparison to the configured clock rate setting to detect over-clocking;
bundling the feedback clock rate setting with a plurality of power-on-configuration (POC) signals generated in response to a reset of the processor; and
providing the POC signals to the processor following the reset.

35. The method of claim 34 wherein generating the feedback clock rate setting comprises one of:
measuring a frequency of the clock signal; and
reading a register storing a code indicating a current clock rate setting of the clock signal.

36. The method of claim 34 further comprising:
storing the clock rate setting during each reset of the processor.

37. A machine readable medium having stored thereon machine executable instructions, the execution of which to implement a method comprising:
providing a configured clock rate setting from a processor for use by a peripheral set;
receiving a feedback clock rate setting at the processor from the peripheral set, said feedback clock rate setting being bundled with a plurality of power-on-configuration (POC) signals generated in response to a reset of the processor; and
comparing the configured clock rate setting and the feedback clock rate setting to detect over-clocking of the processor.

38. The machine readable medium of claim 37 wherein the method further comprises:
placing the processor in a detected state if over-clocking is detected.

39. The machine readable medium of claim 37 wherein the method further comprises:
generating a clock signal at the peripheral set based on a clock rate setting;
providing the clock signal from the peripheral set for use by the processor;
generating the feedback clock rate setting based on a clock rate of the clock signal;
bundling the feedback clock rate setting with the POC signals; and
providing the POC signals to the processor following the reset.

* * * * *